United States Patent
Spero et al.

(10) Patent No.: US 7,273,308 B2
(45) Date of Patent: Sep. 25, 2007

(54) INTERNAL ILLUMINATION BASED SIGN DEVICE

(75) Inventors: Evan Spero, Moshav Tifrach (IL); Menachem Philipovsky, Benai Barak (IL)

(73) Assignee: Ledi Lite Ltd., Jerusalem (IL)

( * ) Notice: Subject to any disclaimer, the term of this patent is extended or adjusted under 35 U.S.C. 154(b) by 0 days.

(21) Appl. No.: 10/484,622

(22) PCT Filed: Jul. 23, 2002

(86) PCT No.: PCT/IL02/00607

§ 371 (c)(1),
(2), (4) Date: Aug. 10, 2004

(87) PCT Pub. No.: WO03/010738

PCT Pub. Date: Feb. 6, 2003

(65) Prior Publication Data

US 2005/0030764 A1    Feb. 10, 2005

Related U.S. Application Data

(60) Provisional application No. 60/307,341, filed on Jul. 23, 2001.

(30) Foreign Application Priority Data

Oct. 18, 2001   (IL) ...................................... 146065

(51) Int. Cl.
*A45D 42/10*   (2006.01)

(52) U.S. Cl. ...................... 362/560; 362/559; 362/612; 362/812; 362/607; 40/541; 40/546

(58) Field of Classification Search ................ 362/812, 362/559, 609, 612, 607, 618, 560, 330; 40/470, 40/542–546
See application file for complete search history.

(56) References Cited

U.S. PATENT DOCUMENTS

| | | | | |
|---|---|---|---|---|
| 2,623,313 | A | * 12/1952 | Fuchs | .......................... 40/546 |
| 4,729,068 | A | * 3/1988 | Ohe | ........................... 362/615 |
| 4,952,023 | A | 8/1990 | Bradshaw et al. | |
| 5,105,568 | A | 4/1992 | Branning | |
| 5,381,309 | A | * 1/1995 | Borchardt | ................... 362/612 |
| 5,388,357 | A | 2/1995 | Malita | |

(Continued)

FOREIGN PATENT DOCUMENTS

WO   WO-00/31715 A1   6/2000

OTHER PUBLICATIONS

Public prior use Sun Mate Solar Address Light—Operating Manual, Model No. 221, 1993.

*Primary Examiner*—Sandra O'Shea
*Assistant Examiner*—Zahra I. Bennett
(74) *Attorney, Agent, or Firm*—Browdy and Neimark, PLLC (57) ABSTRACT

An illuminating unit (28) is presented for use in an internally illuminated sign device (1) for displaying a pattern indicative of certain fixed information within an indicia area. The illuminating unit (28) comprises a light boundary structure (33) for a light source (38) to be mounted thereon. The light boundary structure (33) has an indicia area carrying side (16) having said pattern indicative of the information to be displayed, and has an inner surface made of at least one highly reflective material to thereby increase the amount of light propagating from the light source (38) to said indicia area 30 Claims, 5 Drawing Sheets

U.S. PATENT DOCUMENTS

| | | | |
|---|---|---|---|
| 5,522,540 A * | 6/1996 | Surman | 232/17 |
| 5,539,623 A | 7/1996 | Burns et al. | |
| 5,729,925 A | 3/1998 | Prothero | |
| 5,950,340 A * | 9/1999 | Woo | 40/564 |
| 6,026,602 A | 2/2000 | Grondal et al. | |
| 6,203,391 B1 * | 3/2001 | Murasko | 445/24 |
| 6,367,180 B2 * | 4/2002 | Weiss et al. | 40/580 |

* cited by examiner

INTERNAL ILLUMINATION BASED SIGN DEVICE

FIELD OF THE INVENTION

This invention is generally in the field of sign devices, and relates to an internal illumination based sign device. The present invention is particularly useful as an outdoor sign device, for example as a house number sign.

BACKGROUND OF THE INVENTION

Indoor and outdoor illuminated signs are known devices widely used all over the world for orientation, advertising and other purposes, and are typically installed in public places where a large number of people can see them. Many signs need to be visible at night and this is often accomplished by internally illuminating the information (indicia) presented on a sign panel. Various techniques are used to construct a sign device with substantially uniform illumination of the indicia.

Most of the conventional devices of the kind specified utilize fluorescent tubes or incandescent lamps as light sources, which are characterized by up to a 360°-spread of generated light. A light box utilizing such a light source is typically equipped with reflectors and diffusers so as to prevent the creation of "hot spots" and regions of excessively greater than average illumination, and to obtain uniform distribution of light impinging onto the inner surface of the front panel. This results in a drastic reduction in the amount of light emerging from the front, indicia-containing panel of the device towards the viewer.

Internally illuminated sign devices utilizing light emitting diodes (LEDs) as light sources have been developed, and are disclosed, for example, in U.S. Pat. Nos. 5,105,568; 5,539,623; 5,388,357; 5,729,925; and 4,952,023. According to U.S. Pat. No. 5,105,568, a plurality of LEDs is aligned along all the parts (letters) of textual information, and high reflective elements are provided on selective areas of the inner surface of the sign panel. According to U.S. Pat. No. 4,952,023, reflectors are used in the optical path of light propagating inside the light box towards the sign panel.

Illuminated house signs are generally installed on the outside of the home to show a family name and/or house number and street name. Such signs need to be reasonably priced and suitable for mass production. Such a sign device also needs to be custom-made so as to carry a unique family name and/or a specific house number. Conventionally, this is achieved by making an illuminating box wide enough to encompass several letters and/or numerals, and using a mask, which is supplied in sufficient duplicates of letters and/or numerals to create the specific indicia (address and/or name). When in operation, the mask covers the illuminating box to create indicia showing the desired house number, address or family name.

SUMMARY OF THE INVENTION

There is a need in the art to improve the operation of internal illumination based sign devices, by providing a novel illuminating unit, power supply unit, and sign device utilizing the same.

There is also a need in the art for a modular house sign device that is custom-made without the need for customized manufacture.

Sign devices need to be easy to mount by the purchaser himself without the need for a specialist's assistance. They also need to resist environmental hazards such as sun radiation, humidity and rain, etc. to ensure continuous and reliable operation.

The device of the present invention provides for effective internal illumination of an indicia area by maximizing the amount of light from a given source reaching the indicia area; effective use of a solar cell panel; and easily assembling the custom-made indicia area within the device.

There is thus provided according to one aspect of the present invention, an illuminating unit for use in an internally illuminated sign device for displaying a pattern indicative of certain fixed information within an indicia area, the illuminating unit comprising a light boundary structure for a light source to be mounted thereon, wherein said light boundary structure has an indicia area carrying side having said pattern, and has an inner surface made of at least one highly reflective material to thereby increase the amount of light propagating from the light source to said indicia area.

The light boundary structure defines a light containment vessel (volume). Such a vessel may be shaped like a box (i.e., the so-called "light box"). It should be understood that the term "light box" used herein signifies a closed structure, which may or may not have a rectangular cross-section, and may or may not be integral, provided it defines at least one indicia carrying side, patterned in accordance with said information to be displayed. The indicia pattern is formed by translucent regions surrounded by non-translucent regions, which, at the inner surface of the indicia carrying side, are surrounded by the highly reflective regions.

For example, such a light boundary structure may be a six-sided box (one- or two part) having a four or five-sided frame (rigid, or flexible, or tape-like), attachable to, respectively, a single indicia area-carrying side or two opposite indicia-carrying sides. As for the sidewalls of such six-sided box, they may have straight or curved surfaces (e.g., formed by two or more facets with sharp or truncated corners).

The term "highly reflective material" used herein signifies a highly diffusive (scattering) material or specularly reflective material.

The light source preferably comprises at least one light emitting diode (LED), which is preferably mountable aside the indicia carrying side. For example, one or more LED may be mounted on the side wall(s) of the sic-sided light boundary structure.

The indicia-carrying side may be removably mountable onto the light boundary structure. By this, a selected indicia area can be mounted in the illuminating unit.

The indicia-carrying side may be formed by a first panel patterned in accordance with the information to be displayed and having the highly reflective regions at its inner surface, and a second panel facing the inner surface of the first panel. In this case, the second panel is made of a translucent material. The first panel may be removably mountable onto the second panel of the indicia-carrying side of the light boundary structure. The light boundary structure may be a two-part structure formed by this second panel and a frame attachable thereto.

Preferably, the highly reflective material within the inner surface of the indicia-carrying side is diffusive, and the other inner surface outside the indicia carrying side is specularly reflective.

According to another aspect of the present invention, there is provided an internally illuminated sign device for displaying a pattern indicative of certain fixed information within an indicia area, the device comprising an illuminating unit having a light boundary structure for a light source to be mounted thereon, said light boundary structure having an indicia area carrying side, and an inner surface made of at least one highly reflective material to thereby increase the amount of light propagating from the light source to said indicia area.

According to yet another aspect of the present invention, there is provided an internally illuminated sign device for displaying a pattern indicative of certain fixed information within indicia areas, the device comprising an illuminating unit having a light boundary structure for a light source to be mounted thereon, wherein the light boundary structure is a closed structure formed by two indicia area carrying sides, the inner surface of said structure containing at least one highly reflective material to thereby increase the amount of light propagating from the light source to each of the indicia areas.

The sign device preferably comprises a power supply source having a battery assembly connectable to the light source. This power supply source preferably comprises a switching circuit for controlling the operation of the battery assembly.

The switching circuit may comprise a connector shiftable between its operative and inoperative positions, such that when in the operative position, the connector actuates the battery assembly, and when in the inoperative position, prevents the battery assembly from being actuated, thereby enabling to keep the battery assembly disconnected when the device is not in use.

The switching circuit may comprise a battery recharge circuit operable to selectively disconnect the battery assembly from the light source, and/or recharge the battery assembly, in which case the switching circuit comprises a voltage limiting circuit operable to limit voltage created by the solar cell circuit to thereby provide a desired input voltage to the battery assembly. Preferably, the switching circuit comprises a current adjusting circuit operable to provide a constant electric current through the light source.

Thus, according to yet another aspect of the present invention, there is provided a power supply source for use with an internally illuminated sign device to supply power to a light source, the power supply source comprising a battery assembly and a switching circuit for controlling the operation of the battery assembly to provide at least one of the following effects: selective connection and disconnection of the battery assembly to and from the light source; recharge of the battery assembly; supply of a constant electric current to the light source.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
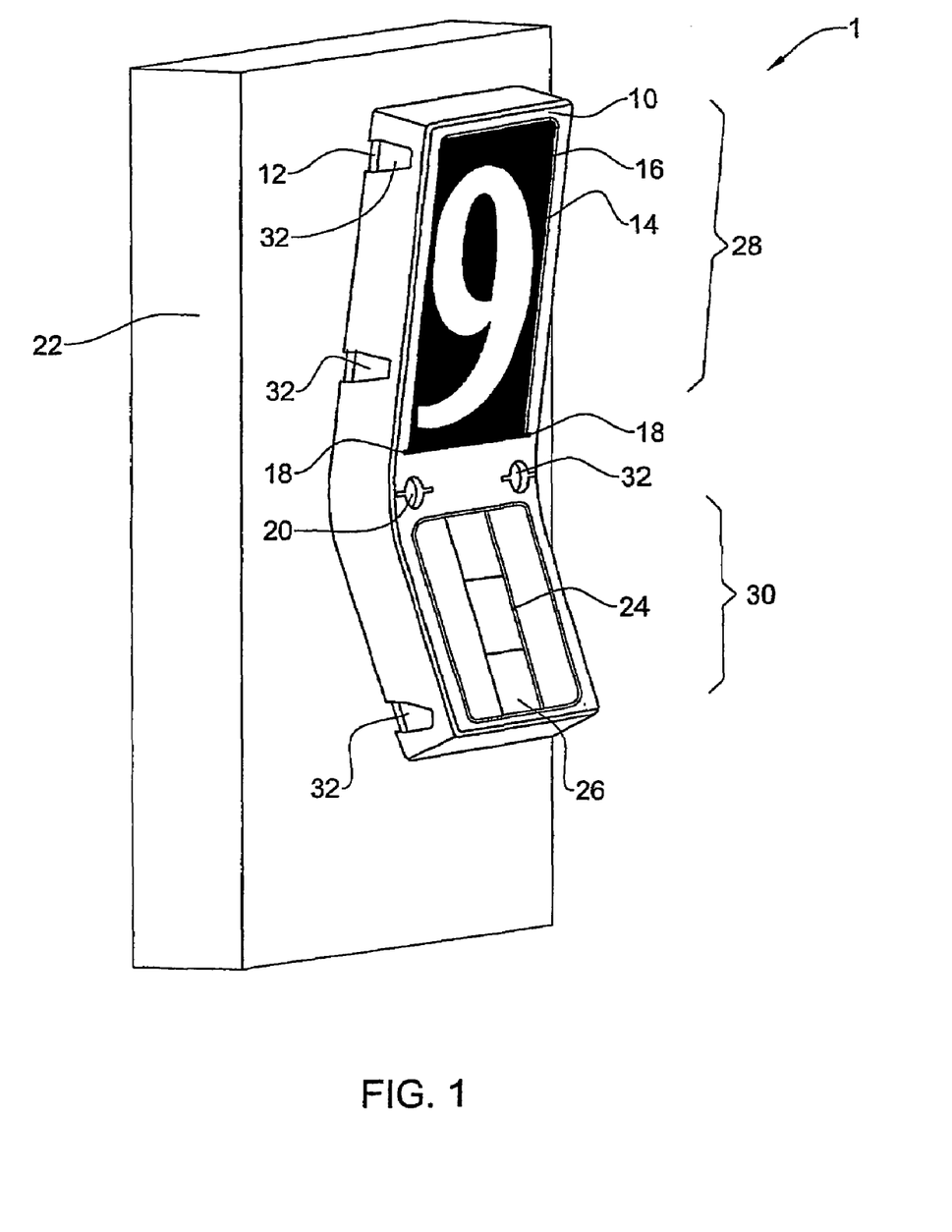
FIG. 1 illustrates a sign device according to the invention exemplified as a house-number sign device.

Referring to FIG. 1, there is illustrated an internally illuminated sign device 1 according to the invention. In the present example, the device 1 is a house-number sign device, but it should be understood that it may be any outdoor on indoor sign device of the kind utilizing internal illumination of an indicia area, i.e., a specific pattern indicative of certain fixed information (numeral "9" in this specific example). Additionally, in the present example, the sign device utilizes a solar cell based power supply source.

The device 1 comprises two functionally different units, an illuminating unit 28 and a power supply unit 30, which are encompassed in a common housing, which, in the present example, is composed of a front frame-like structure 10 and a rear cover 12. The housing (its frame 10) has, in its upper part, a window 14 for viewing therethrough an indicia area carrying panel 16. The panel 16 can be removably mounted in the device 1 by inserting it into the window 14, for example via tracks 18. The frame 10 has one or more holes 20 (two such holes in this specific example) for securing the device 1 to a holding surface 22 (e.g., the house wall). Located at the lower part of the frame 10 is a further window 24, exposing therethrough a solar cell panel 26 (having one or more solar cells).

The illuminating unit 28 (also referred to as a "light box") is disposed within the upper part of the housing, and the power supply unit 30 is disposed within the lower part of the housing. The operation of the light box 28 and of the power supply unit 30, will be explained later on. It should be understood that the invention is not limited by this specific example utilizing a two-part housing, rigid frame, and disposition of the illuminating and power supply units at upper and lower parts of the device, and any other suitable arrangement can be used for the purposes of the present invention. For example, the illuminating and power supply units could be mounted in separate cases connectable to each other, or the elements of these functional units may be incorporated in a common unit.

In this specific example, the sign device 1 utilizes the solar energy based power supply, and for these purposes, the device has a curved shape or at least curved front surface (for example like an "open V-shape" or arch shape). Hence, when the device is in use, i.e., is appropriately secured to the support surface, the indicia area carrying panel is exposed to viewers, while the solar panel is inclined upward (with respect to the vertical plane) so as to collect more global solar radiation (as compared to its vertical position). Preferably, the light box 28 or at least the indicia area carrying panel 16 is slightly tilted forward (i.e., inclined with respect to the vertical plane) so as to reduce glare in direct sunlight.

It should also be noted that in this specific example of FIG. 1 the device 1 is the single-sided sign device (with the indicia area on its one side only). When a double-sided sign device is to be used, the device should be designed so as to be mountable by its sidewall onto a support surface. The construction of the double-sided sign device will be described more specifically further below with reference to FIG. 6. Generally, for the sign device, it may have any shape other than a box-like shape, provided it defines a closed structure serving as a light container and having an indicia area carrying surface.

As further shown in FIG. 1, the housing (its frame 10) has recesses 32 on one side, and preferably also corresponding knobs (not seen) at the opposite side. This arrangement of recesses and knobs allows connecting the device 1 to one or two similar devices, each independently operable to display its own information, and thereby create a modular sign structure for displaying multi-symbol information.

It should be understood that by providing an appropriate recess-and-knob arrangement, various combinations of attachments between several independent sign devices (modules) are made possible for creating various signs, such as straight and/or diagonally patterned signs, etc. It should also be understood that the provision of recesses and knobs is optional and any other arrangement is possible to provide a modular sign structure. Alternatively, it is not mandatory to use such arrangements and the separate devices can be adjacently affixed to the support surface in an appropriate order defined by the user and the information to be displayed.

The illuminating unit 28 according to the invention is designed to provide highly efficient illumination of an indicia area (i.e., a specific pattern indicative of certain fixed information to be displayed) by light generated by a light source (preferably one or more LEDs) and provide a maximal amount of light exit to the viewer with uniform luminescence over the character face. This is achieved by making the inner surface of the illuminating unit from at least one highly reflective material (except for translucent regions of the pattern within the indicia area), such that this inner surface serves as a light directing means for directing light generated by a light source towards the indicia area. Preferably, the inner surface of the indicia area carrying panel or side contains diffusive material, and the inner surface outside the indicia carrying side contains specularly reflective material.

Figure 2:
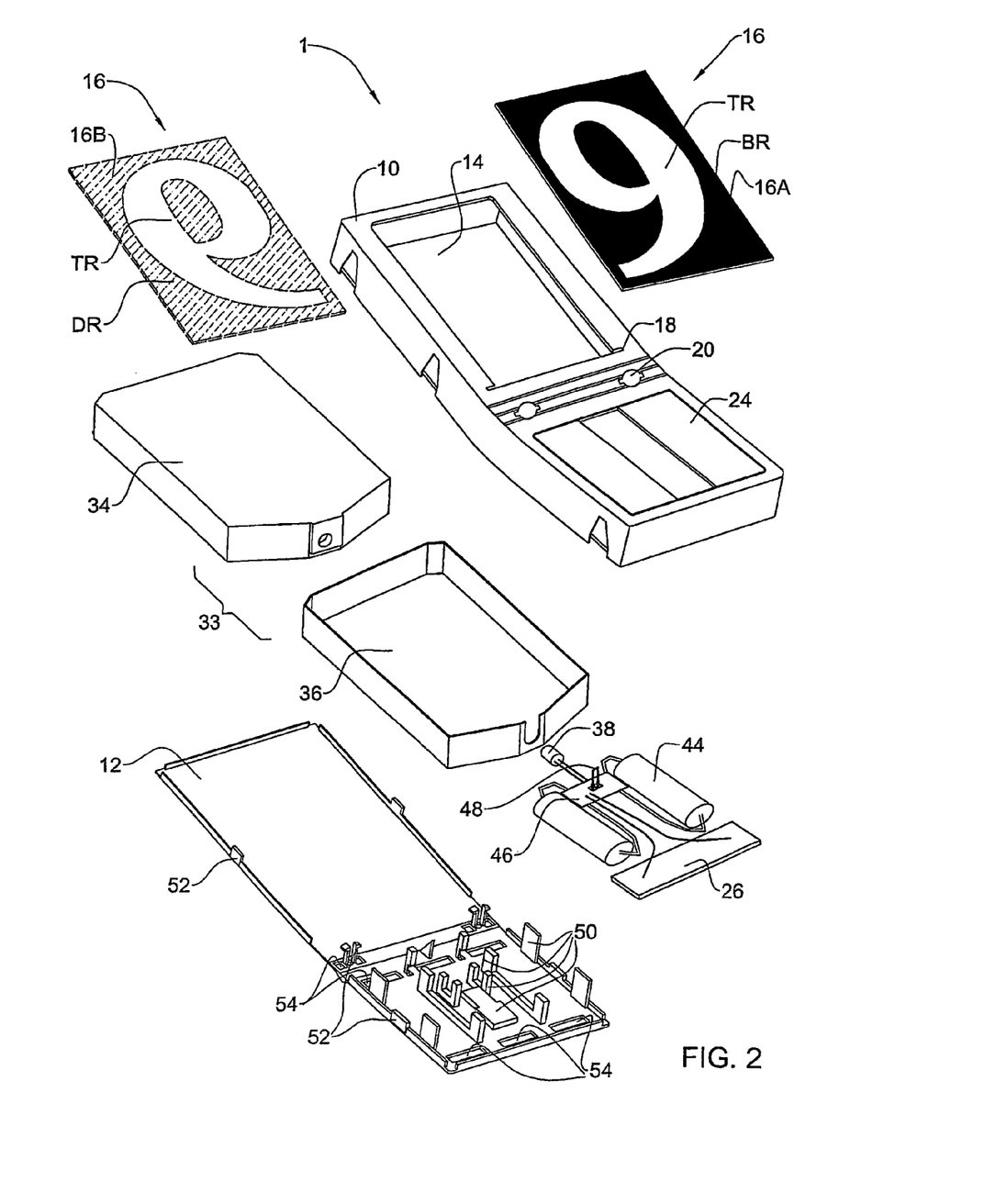
FIG. 2 more specifically illustrates the construction of the illuminating and power supply units of the device of FIG. 1.

The construction of the illuminating unit 28 is more specifically illustrated in FIG. 2. The illuminating unit 28 presents a light boundary structure, which, in the present example, has a box-like structure 33, and utilizes the indicia area carrying panel 16 (presenting the front panel of the unit 28) removably mountable onto the box-like structure 33. The structure 33 in the present example is formed by two attachable parts: a rear frame 36 and an upper frame or panel 34. The indicia area carrying panel 16 is removably mountable onto the panel 34, and these panels 16 and 34 present together the indicia carrying side of the light boundary structure 28. In the present example, the frames 34 and 36 are designed such that the frame 36 is mountable onto the frame 34. As indicated above, the inner surface of the light boundary structure is highly reflective (except for translucent regions of the pattern within the indicia) and thus serves as the light directing means for directing light generated by a light source towards the indicia area. The light source, which preferably utilizes one or more LEDs (a single LED 38 being shown in the present example) is preferably, supported aside the indicia area carrying side, and more preferably on the sidewall(s) of the light boundary structure. To this end, the structure 28 is formed with corresponding openings in the frames 34 and 36 for the LED 38 to be mounted therein so as to emit light towards the inside of the structure 28. It should be noted that generally LED(s) may be appropriately accommodated inside the boundary structure, as well.

An LED of any known type and of any color can be used in the device of the present invention. Preferably LEDs having very high conversion efficiency (about 30 lumen per watt), low forward voltage, and color standing out clearly at dusk and/or in fog (where other colors are less discernable) are used.

The indicia area (within which the number "9" is presented) is a pattern formed by translucent regions TR which at the outer surface 16A of the panel 16 are surrounded by light blocking or opaque regions BR, and at the inner surface 16B of the panel 16 are surrounded by highly reflective regions RR, which are preferably formed by a reflective diffusive material, such as 3M Light Enhancement Film (LEF) or a high reflective printed layer. The other panel 34 of the indicia area carrying side underlining the panel 16 is thus made of a translucent diffusive material such as Polycarbonate or Acryl enhanced with a diffusive additive. As for the inner surface of the rear panel 36, it is preferably specularly reflective (with reflectivity of more than 84%, for example polished aluminum sheet such as Alanod Miro-4 or Everbrite 95). The operation of the light box 28 (i.e., the light propagation scheme) will be described farther below with reference to FIG. 3. The indicia carrying panel or side can be manufactured as a multi-layer structure, as will be described more specifically further below with reference to FIG. 4.

In the light boundary structure 28 of FIGS. 1 and 2, the sidewall (e.g., intended for carrying the LED(s)) is a two-facet side. It should, however, be noted that a light boundary structure may have two opposite two-facet sides, two-face sidewall(s) with the facets arranged in a concave or convex manner, straight sidewalls normal to the front and rear sides or inclined with respect to either the front or rear side, or may have convex or concave rounded sidewall(s). Generally, the shape of the light boundary structure is selected in accordance with the indicia area dimension, the number of LEDs and their orientation, as well as highly reflective materials used at the inner surfaces of the light boundary structure, and the specific application of the device (i.e., to be a single- or double-sided sign device). All these examples are suitable for both the single-sided and double-sided sign device.

The sign device according to the invention is energy self-sufficient in that it includes an autonomous power source unit 30, having a battery assembly (including at least one battery) for supplying the LED with sufficient energy to ensure continuous and reliable operation, and preferably also having the solar cell panel 26 (at least one solar cell) enabling the operation of the LED when needed (depending on the amount of ambient light in the vicinity of the sign device, and/or enabling recharge of the battery). It should be noted that, generally, the solar cell can be replaced by any photoswitching device, such as photodiode. Thus, as exemplified in FIG. 2, the power supply unit 30 comprises the solar cell panel 26 (for example comprising three tandem amorphous cells), the battery assembly 44, and a switching circuit 46 having an activator switch 48. It should be noted although not specifically shown, that the power supply unit 30 may include more than one solar cell panel, and may include the battery assembly 44 as the only power source. The power supply unit elements 26, 44 and 46 are mounted on the rear cover 12 of the housing and are supported by elements 50. The rear cover 12 also has clips 52 that are used to attach the cover 12 to the frame 10, and is formed with small windows 54 that permit air circulation within the device 1.

The batteries 44 can be supplied with the sign device or separately from the device. In the case of supplying the device with batteries (i.e. non-rechargeable batteries or rechargeable batteries that were charged prior to installation into the device), the battery assembly is disconnected in order to prevent the batteries from discharging. In order to provide initial actuation of the battery assembly when the device is out in operation, the switching circuit 46 includes a connector jumper serving as an activator switch 48. The batteries are connectable to an electronic circuit via the connector jumper 48, which is implemented in the following manner. The connector jumper 48 is shiftable between its inoperative position being disconnected from the electronic circuit and its operative position being connected to the circuit so as to close the circuit with the battery. When the device is not in use (say, between the time of manufacture and the time of installation), the jumper connector 48 is not mounted in the switching circuit being kept together with the device as a separate element, and the batteries 44 are thus disconnected from the electrical circuit being thereby bound from discharging. When putting the device into operation, the jumper connector 48 is placed so as to be included in the electric circuit, thereby closing the circuit with the battery, and shifting the device into its operative position for providing immediate illumination. When utilizing the device with attachable batteries, the device may not include a first-operation activator.

The battery assembly 44 may comprise rechargeable Alkaline Manganese (RAM) cells or rechargeable Pb/Pbo cells, having a minimal self-discharge rate. In this case, the circuit 46 is designed so as to enable the batteries 44 to be controllably charged by the solar cells. The switching circuit 46 may include a battery recharge circuit operable to recharge the battery (e.g., by means of the solar cell), and also includes a voltage limiting circuit operable to desirably limit the voltage supply to the battery from the solar cell.

The switching circuit 46 is designed for controlling the operation of the battery assembly 44 to provide at least one of the following effects: selective connection/disconnection of the battery assembly, recharge of the battery assembly (e.g., by means of a solar cell), supply of a constant electric current to the light source, and limit the voltage supply to the battery from the solar cell. An example of the electric scheme of the switching circuit 46 will be described more specifically further below with reference to FIGS. 5A and 5B.

The rechargeable batteries may be supplied as pre-charged. In that case, the above-mentioned connector jumper 48 controls the first actuation of the device. If the rechargeable batteries are not pre-charged prior to being supplied with the device, the device when activated for the first time will immediately start solar charging but will effect illumination only after sufficient energy is gathered. Attachable batteries can be supplied separately from the device. In this case, the customer needs to install the batteries and to replace them by new ones from time to time.

In all the above-mentioned examples, the switching circuit 46 can include the battery recharge circuit (solar cell based circuit in the present example) for controlling the operation of the battery assembly by selectively switching the batteries between ON and OFF stages according to the solar cell state that depends on the amount of solar energy in the vicinity of the solar cell panel. In addition, in all the above-mentioned examples, the battery assembly, comprising either rechargeable batteries or not, can be replaceable.

Figure 3:
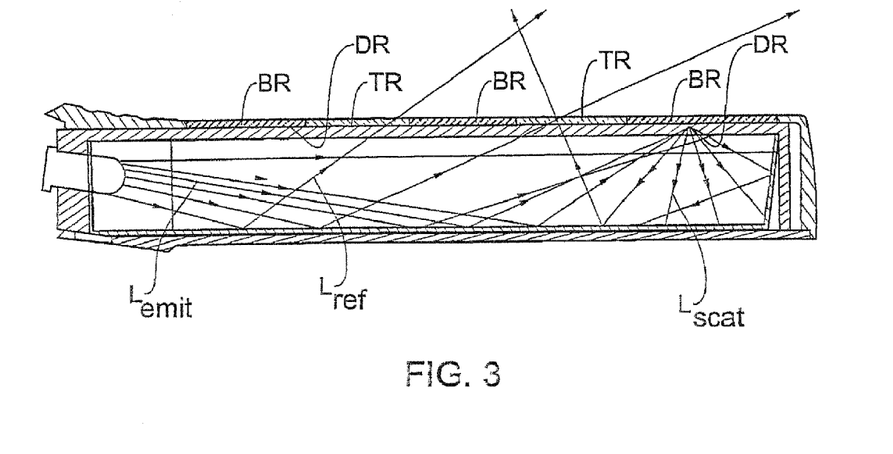
FIG. 3 illustrates the light propagation scheme utilized in the illuminating unit according to the invention.

Turning now to FIG. 3, there is illustrated the light propagation scheme in the light boundary structure according to the invention (e.g., structure 28 of FIGS. 1 and 2). In the present examples, the light boundary structure is designed for a single-side sign device. As shown, the LED 38 is mounted on a sidewall of the light boundary structure such that it emits light substantially towards the opposite sidewall and the side opposite the indicia area carrying side 16. As shown in the figure in dashed lines, if no reflective coating was provided on the inner surface of the light boundary structure, a great amount of the emitted light $L_{em}$ would be lost. Due to the provision of this reflective coating, the emitted light impinging onto the specularly reflective inner surface is reflected back $L_{ref}$ towards the pattern carrying panel (e.g., while passing through the diffusive transmitting panel, as the case may be), and those portions of this specularly reflected light that impinge onto the translucent regions TR of the indicia area emerge from the structure, while the portions of the specularly reflected light impinging onto the diffusive reflective regions DT of the inner surface of the indicia carrying side are scattered back $L_{scat}$ to the inside of the structure where they undergo further specular reflection and so on.

By making a proper choice of the light pattern distribution from the concentrated light source, the number of reflections that a light ray must undergo until it exits the sign face can be minimized.

Additionally, selective use of high reflectance materials of different reflective properties (i.e. specular vs. diffuse), can minimize the reflections, further increase the efficiency and provide even luminance along the illuminated indicia area. Thus, if a light source with rays almost parallel to the panel is distant from an exiting area (indicia area), then a specularly reflective material is used to allow the light ray to continue its propagation towards the indicia area without extra reflections. However, within the indicia area, a diffuse reflecting surface affects the angle of reflection, such that the light ray has a greater chance of exiting through the proximate indicia openings (translucent regions). Thus, depending on the sign device arrangement (the dimensions of the indicia area, the number of LEDs and their orientation), the inner patterned surface of the light boundary structure (i.e., of its indicia area carrying panel or side) may be made of a highly scattering material such as LEF, and the opposite inner surface of the light boundary structure and preferably also that of the side walls may be made of a specularly reflective material, such as 95% reflective aluminum.

Figure 4A:
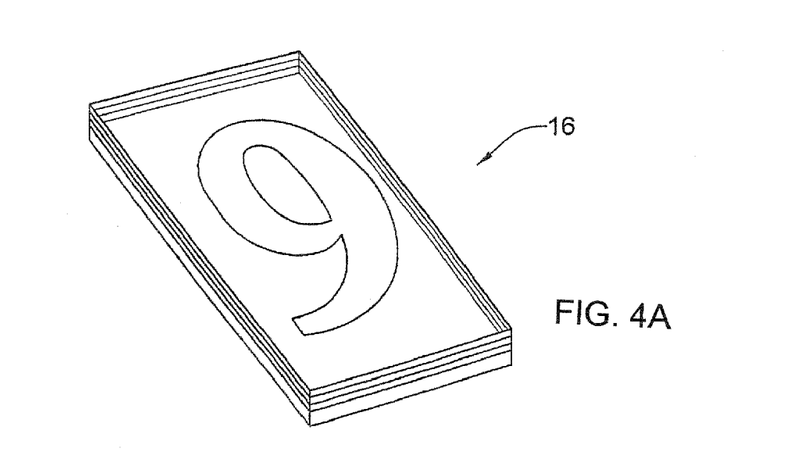
FIGS. 4A and 4B exemplify perspective and side views, respectively, of an indicia are containing side or panel suitable to be used in the illuminating unit of the present invention.
Figure 4B:
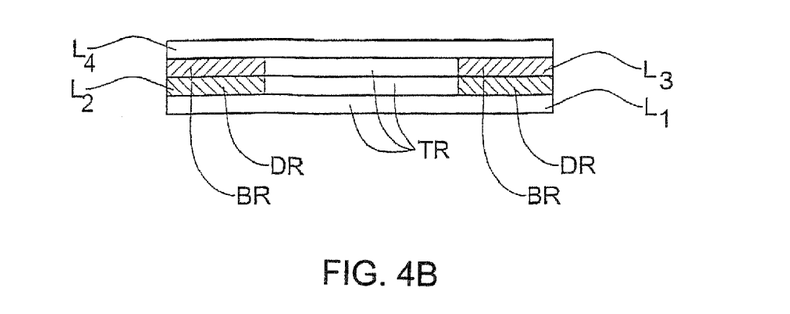

As indicated above the indicia carrying panel or side (16 in FIGS. 1 and 2) can be manufactured as a multi-layer structure. FIG. 4 schematically illustrates the manner of manufacturing such a structure. A substrate layer $L_1$, from which the translucent regions TR of the indicia pattern are formed and which may be a foil plastic (e.g., polyester, PVC, etc.), is sequentially coated by a white opaque film $L_2$ in which the diffusive reflector regions DR of the inner surface of the panel 16 are formed ("negative printing") and a layer $L_3$ in which the blocking regions BR of the pattern are formed on the outer surface of the panel 16 ("negative printing") by using silk print colors. The patterning of this three-layer structure can be done in a single fabrication step, or in a two-step process utilizing the same equipment This three-layer patterned structure is coated by a layer $L_4$ of mat varnish (preventing the structure from UV radiation), which may contain a flame retarding material.

It should be noted, although not specifically shown, that for some applications, the propagation of light emerging from the sign device with a specific solid angle segment of the entire 180°-space is sufficient for the effective operation of the device. To this end, the sign device may comprise additional light directing means in the form of a plurality of lenses located within the translucent regions of the indicia pattern. This can be implemented by making these regions of the translucent layer (basic layer $L_1$ in the structure shown in FIG. 4) with a specific surface relief acting as lenses.

Figure 5A:
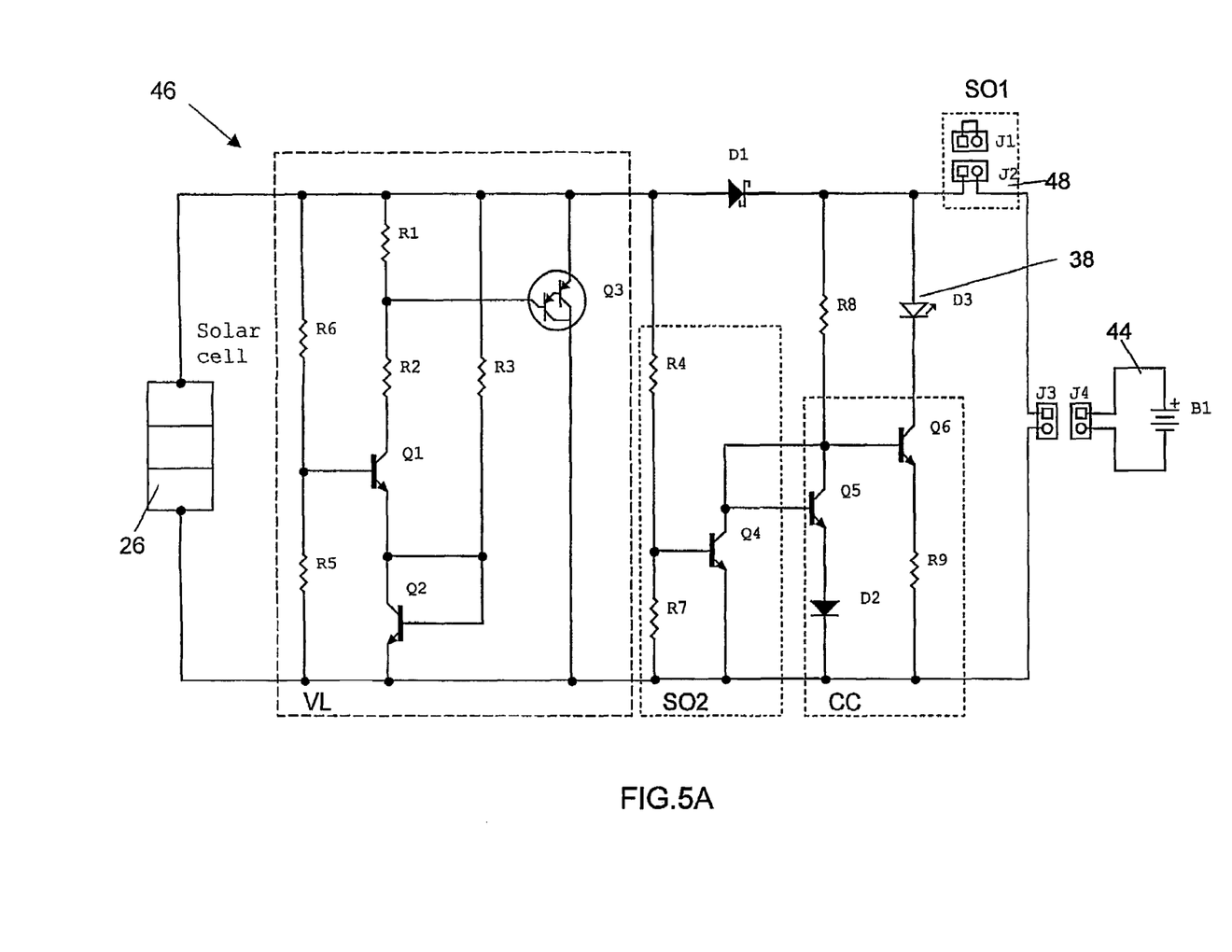
FIGS. 5A-5B illustrate electronic circuitry suitable to be used in the power supply unit of the present invention.

Reference is made to FIG. 5A showing the switching circuit 46 suitable to be used in the power supply unit according to the present invention. As indicated above, the switching circuit 46 is designed for controlling the operation of the battery assembly 44 to provide at least one of the following effects: selective connection/disconnection of the battery assembly, supply of a constant electric current to the light source, recharge of the battery assembly by means of a recharge circuit operable by a solar cell, and limit the voltage supply to the battery from the solar cell. In the present example of FIG. 5A, the switching circuit 46 is intended for use with the sign device that utilizes a replaceable battery assembly that includes two pre-charged rechargeable batteries 44, solar cell panel 26 and one LED-based light source 38, and is designed to carry out all these functions. It should, however, be understood that more LEDs can be used as well, the device of the present invention might not use a battery-based power supply, and might not use a solar cell for the battery recharge purposes.

Thus, in the present not-limiting example, the switching circuit comprises the following functional elements: a connector jumper circuit SO1 (constituting the element 48 in FIG. 2) for the first actuation of the pre-charged battery assembly; a battery recharge circuit SO2 operable by the solar cell 26 for recharge of the battery assembly and for switching the battery operation between operative (ON) and inoperative (OFF) stages; a voltage limiting circuit VL for controlling the input voltage to the battery assembly; and a current adjusting circuit CC to provide the LED with a constant electric current.

Figure 5B:
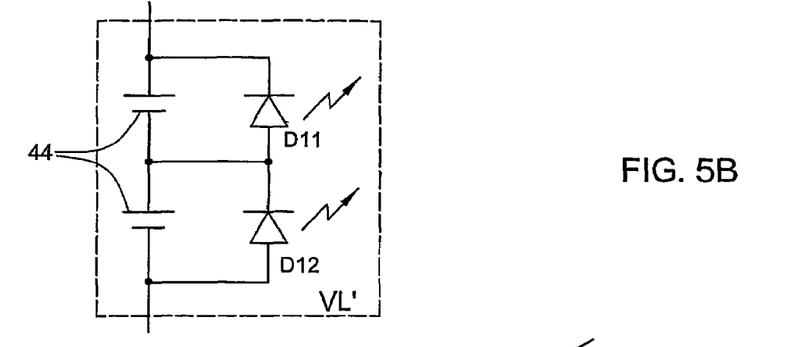

The voltage limiting circuit VL can be implemented in several configurations. In the specific example of FIG. 5A, the circuit VL is designed for efficient operation to prevent an unacceptable high voltage (above 1.7 volts for RAM batteries, for example) from being imposed on either of the batteries. As shown in FIG. 5B, a less efficient voltage limiting circuit VL' can be used being implemented by directly connecting each of the emitting diodes $D_{11}$ and $D_{12}$ in parallel with its corresponding battery. With respect to the circuit VL' of FIG. 5B, the circuit VL of FIG. 5A is more efficient as it allows for avoiding potential losses due to leakage effects of the diodes.

The current adjusting circuit CC is operable by the recharge circuit SO2 and is designed to provide the LED with a constant current while its input voltage varies due to the batteries' varying state of charge.

Figure 6:
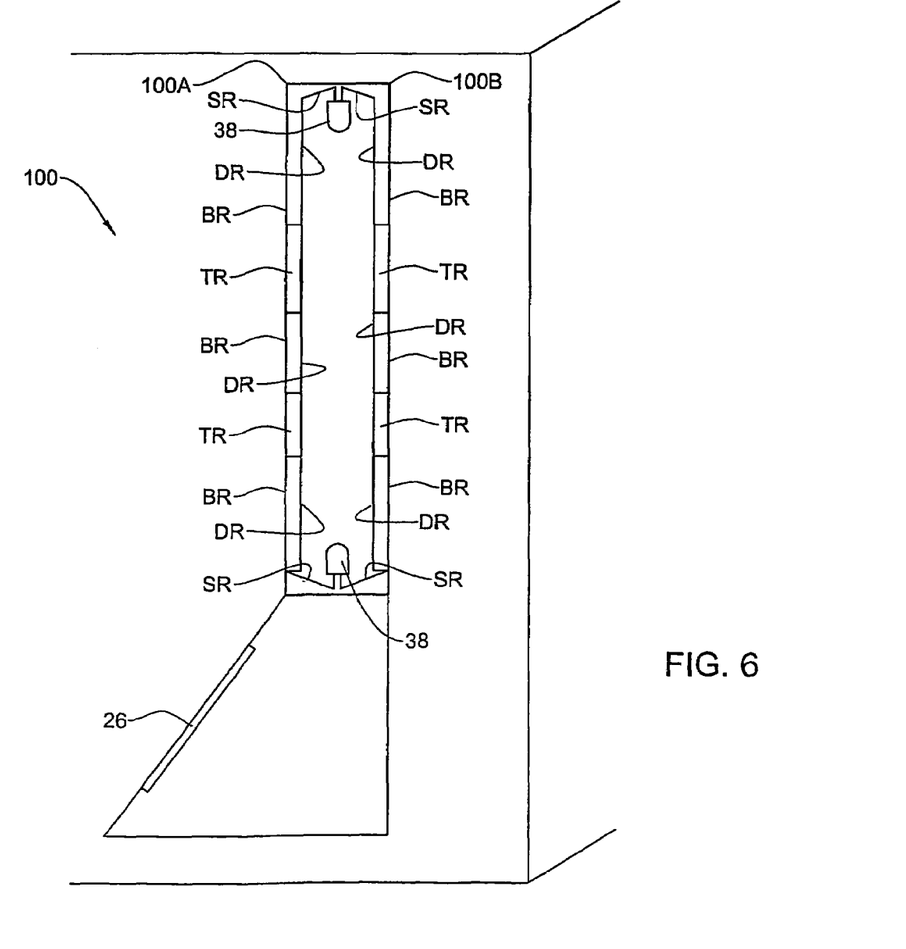
FIG. 6 illustrates a double-side sign device according to the present invention.

Turning now to FIG. 6, there is schematically illustrated how the present invention can be used in a double-side sign device. A sign device 100 is designed to display specific information (a house number in the present example) at its opposite indicia area carrying sides 100A and 100B. In this example, similar to the example of FIGS. 1 and 2, the sign device utilizes a power supply source based on the use of a solar cell 26. Here, two LEDs 38 are used, but it should be understood that generally a single LED can be used or an array of LEDs, which are preferably mounted on the sidewall(s) of the light boundary structure. As shown in FIG. 6, the inner surfaces of the panels 100A and 100B contain diffusive reflective regions DR, and the inner surfaces of the sidewalls contain specularly reflective regions SR. The light impinging on each of the translucent regions TR of the indicia-carrying sides therefore partly origins from the LEDs 38 (i.e. direct light) and partly from the reflective regions SR and DR (i.e. reflected light).

It should be understood that the each of the panels 100A and 100B can be either a single-part structure (e.g., a multi-layer structure as described above with reference to FIG. 4), or a two-part structure as in the example of FIGS. 1 and 2, wherein the upper part by which the device is exposed to the viewers is patterned and has a diffusive reflective material at its inner surface and the lower part is made of a diffusive translucent material.

Those skilled in the art will readily appreciate that various modifications and changes can be applied to the embodiments of the invention as hereinbefore exemplified without departing from its scope defined in and by the appended claims.

The invention claimed is:

1. An illuminating unit for use in an internally illuminated sign device for displaying an indicia pattern indicative of certain fixed information within at least one indicia area, the illuminating unit comprising a light boundary structure for a light source, to be mounted thereon, wherein said light boundary structure is formed of at least two attachable parts including, respectively, a frame and at least one indicia area carrying panel removably mountable onto said frame defining together a six-sided box including the indicia carrying panel, an opposite side, and side walls, at least one of the side walls having a curved surface formed by at least two facets, said at least one indicia area carrying panel being a multi-layer structure formed by at least two layers patterned in accordance with the information to be displayed, an upper external layer of the multi-layer structure of the indicia area carrying panel having translucent regions of the indicia pattern and light blocking regions of the indicia pattern, and a lower inner layer of the multi-layer structure of the indicia area carrying panel having translucent regions of the indicia pattern and reflective regions of the indicia pattern, the illumination unit being thereby configured to increase the amount of light propagating from the light source to said at least one indicia area and enable replacement of the indicia area carrying panel to display different information, and enable visibility of the indicia area via internally reflected light.

2. The illuminating unit according to claim 1, wherein the light source includes at least one LED mounted inside the light boundary structure, the at least one LED for illuminating the indicia area on the indicia area carrying side being oriented such that it emits light directly propagating onto the inner surface of the light boundary structure opposite said indicia area carrying side of the light boundary structure, to thereby increase the amount of light propagating from the light source to said indicia area.

3. The illuminating unit according to claim 1, wherein a portion of the highly reflective inner surface within the indicia area carrying side is made of a reflective diffusive material.

4. The illuminating unit according to claim 1, wherein a portion of said highly reflective inner surface located outside the indicia area carrying side includes a specularly reflective material.

5. The illuminating unit according to claim 1, wherein said light boundary structure comprises a diffusive translucent layer located inside the structure underneath the indicia area carrying side.

6. The illuminating unit according to claim 5, wherein said diffusive translucent layer is a foil plastic selected from the group of polyester and PVC.

7. The illuminating unit according to claim 1, wherein the indicia area carrying side has a protective coating made of mat varnish to thereby prevent said side from UV radiation.

8. The illuminating unit according to claim 7, wherein said protective coating contains a flame retarding material.

9. The illuminating unit according to claim 1, wherein said highly reflective material within the inner surface of the indicia area carrying side is reflective diffusive and includes 3M Light Enhancement Film.

10. The illuminating unit according to claim 1, wherein said highly reflective material of the inner surface of the light boundary structure outside said indicia area carrying side is specular reflective and includes polished aluminum.

11. The illuminating unit according to claim 1, wherein the light source is mountable onto the light boundary structure aside said indicia area carrying side.

12. The illuminating unit according to claim 1, wherein said opposite side is also an indicia area carrying side patterned in accordance with information to be displayed.

13. The illuminating unit according to claim 1, wherein the light source comprises at least one LED mountable onto at least one of the side walls of the light boundary structure.

14. The illuminating unit according to claim 13, wherein said at least one LED is oriented such that it emits light directly onto the opposite side.

15. The illuminating unit according to claim 1, wherein at least the indicia area carrying side of the light boundary structure is inclined downward with respect to a vertical plane so as to reduce glare in direct sunlight.

16. An internally illuminated sign device for displaying fixed information, comprising the illuminating unit of claim 1 and a power supply source connectable to the light source, wherein said power supply source comprises a battery assembly.

17. The device according to claim 16, wherein said power supply source comprises a switching circuit for controlling the operation of the battery assembly.

18. The device according to claim 17, wherein said switching circuit comprises a connector shiftable between its operative and inoperative positions, such that when in the operative position the connector actuates the battery assembly, and when in the inoperative position prevents the battery assembly from being actuated, thereby enabling to keep that battery assembly disconnected when the device is not in use.

19. The device according to claim 17, wherein said switching circuit comprises a recharge circuit operable to recharge the battery assembly.

20. The device according to claim 16, wherein said battery assembly comprises a solar panel.

21. The device according to claim 20, wherein said solar panel is inclined upward with respect to a vertical plane so as to increase the amount of collected global solar radiation.

22. The device according to claim 20, wherein said switching circuit comprises a solar cell circuit, and is operable to selectively disconnect the battery assembly from the light source.

23. The device according to claim 16, wherein said switching circuit comprises a voltage limiting circuit operable to limit voltage created by the recharge circuit to thereby provide a desired input voltage to the battery assembly.

24. The device according to claim 16, wherein said switching circuit comprises a current adjusting circuit operable to provide a constant electric current through the light source.

25. The device according to claim 21, wherein said switching circuit comprises a solar cell circuit, and is operable to selectively disconnect the battery assembly from the light source.

26. An illuminating unit for use in an internally illuminated sign device for displaying a pattern indicative of certain fixed information within an indicia area, the illuminating unit comprising a light boundary structure for a light source to be mounted thereon, wherein said light boundary structure is configured as a six-sided box including an indicia area carrying side having said pattern, an opposite side, and side walls, at least one of the side walls having a curved surface formed by at least two facets, and said light boundary structure has a highly reflective inner surface, wherein the light source includes at least one LED for illuminating the indicia area on the indicia area carrying side which is, mounted on at least one of the side walls of the light boundary structure and oriented such that it emits light directly propagating onto the inner surface of the light boundary structure outside said indicia area carrying side which is to be illuminated by said at least one LED, to thereby increase the amount of light propagating from the light source to said indicia area.

27. A power supply source for use with the illuminating unit of claim 1 to supply power to the light source, the power supply source comprising an assembly of rechargeable batteries, a solar cell and a switching circuit for controlling the operation of the battery assembly and of the solar cell to provide the following effects: selective connection and disconnection of the battery assembly to and from the light source; recharge of the battery assembly by means of the solar cell; supply of a constant electric current to the light source.

28. The power supply source according to claim 27, wherein said selective disconnection of the battery assembly utilizes photoswitch element.

29. The power supply source according to claim 27, wherein said switching circuit comprises a voltage limiting circuit operable to limit voltage created by the recharge circuit to thereby provide a desired input voltage to the battery assembly.

30. An illuminating unit for use in an internally illuminated sign device for displaying a pattern indicative of certain fixed information within two opposite indicia areas, the illuminating unit comprising a light boundary structure for a light source to be mounted thereon, wherein said light boundary structure is a six-sided box formed of attachable parts including a frame defining side walls with at least one of the side walls having a curved surface formed by at least two facets, and first and second indicia area carrying panels removably mountable onto said frame, the indicia area carrying panel being a multi-layer structure formed by at least two layers patterned in accordance with the information to be displayed, an upper external layer of said multi-layer structure of the indicia area carrying panel having translucent regions of the indicia pattern and light blocking regions of the indicia pattern, and a lower inner layer of said multi-layer structure of the indicia area carrying panel having translucent regions of the indicia pattern and reflective regions of the indicia pattern, the illumination unit being thereby configured to increase the amount of light propagating from the light source to said indicia areas and enable replacement of the indicia area carrying panels to display different information, and enable visibility of the indicia areas via internally reflected light.

* * * * *